US011058957B2

(12) United States Patent
Li et al.

(10) Patent No.: US 11,058,957 B2
(45) Date of Patent: Jul. 13, 2021

(54) METHOD, DEVICE AND SYSTEM FOR GAME DIFFICULTY ASSESSMENT

(71) Applicant: BEIJING BYTEDANCE NETWORK TECHNOLOGY CO., LTD., Beijing (CN)

(72) Inventors: Chaoran Li, Beijing (CN); Simon Cheng Liu, Beijing (CN); Heng Ma, Beijing (CN); Xianghao Guo, Beijing (CN); Cong Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/367,215

(22) Filed: Mar. 27, 2019

(65) Prior Publication Data
US 2019/0351334 A1    Nov. 21, 2019

(30) Foreign Application Priority Data
Aug. 30, 2018  (CN) .......................... 201811000985.2

(51) Int. Cl.
*A63F 13/40*  (2014.01)
*A63F 13/798*  (2014.01)
*A63F 13/67*  (2014.01)
(52) U.S. Cl.
CPC ............ *A63F 13/798* (2014.09); *A63F 13/67* (2014.09)

(58) Field of Classification Search
CPC .......... A63F 13/40; A63F 13/60; A63F 13/67; A63F 13/73; A63F 13/798
See application file for complete search history.

(56) References Cited

U.S. PATENT DOCUMENTS 10,384,133 B1 *  8/2019  Aghdaie ............... A63F 13/822
2010/0279762 A1 * 11/2010  Sohn ....................... A63F 13/67
463/23

* cited by examiner

*Primary Examiner* — Omkar A Deodhar
(74) *Attorney, Agent, or Firm* — BakerHostetler

(57) ABSTRACT

The present disclosure relates to a method, a device and a system for computer game difficulty assessment. The method comprises: recording game data by a data collector in a process of simulating game playing by operating a computer game through an API (Application Programming Interface) of the computer game using an agent algorithm; measuring a goal attainment difficulty of the computer game at this timing according to goal completion degrees of a plurality of goals corresponding to all attempts at each decision-making timing in the recorded game data; measuring a strategy space-related difficulty of the computer game at this timing according to goal completion degrees of a plurality of goals corresponding to all actions at each decision-making timing in the recorded game data; assessing difficulty of the computer game based on a goal attainment difficulty and a strategy space-related difficulty at each timing.

16 Claims, 11 Drawing Sheets

METHOD, DEVICE AND SYSTEM FOR GAME DIFFICULTY ASSESSMENT

This application claims priority to Chinese Patent Application No. 201811000985.2, filed on Aug. 30, 2018, which is hereby incorporated by reference in its entirety as if fully set forth herein.

TECHNICAL FILED

The present disclosure relates to the field of computer game technologies, in particular to a method, a device and a system for game difficulty assessment.

RELATED ART

How to design a computer game with moderate difficulty is a puzzling problem for game designers. The game difficulty is an intuitive feeling for players and is difficult to be measured by a numerical value. In the related art, most play testing methods are performed by human. Usually, the designer looks for players for game testing, provides a test version, improves the game by collecting the players' feedback, and then obtains further feedback by continuous tests. In the game design, the designer firstly develops a version with suitable difficulty he or she thinks according to his or her priori knowledge. Then a test department assesses the current version, lets different players play this game, and then collects scores given by the players. Finally, the designer changes numerical value information of the game according to statistical information of the test feedback, and then issues a new version. By repeating such processes, the designer may improve the game step by step.

That is, in the related art, the play testing process needs human intervention, and the assessments are obtained by feedback from human. There are several problems in this method. Firstly, human players have different abilities, and are good at learning. In this case, a game test needs players with different levels, but the players who have finished the test may not be suitable for testing new game versions, and thus every test consumes lots of manpower and money to establish experimental samples. Secondly, test results are decided by human feedback which is based on player's feeling. It is difficult for the player to quantize his or her feeling which may change with a change in his or her emotion. Usually, the experience of one player in the game may change with his or her prior game experience. Therefore, during test, more accurate game assessment can be obtained only by enlarging the number of players, and this needs to increase the number of times for testing game contents. Each design, assessment, feedback and redesign take time and needs lots of manpower, and it is difficult to let many people do test at the early stage, which may lead to inaccurate final assessment results.

That is, the difficulty testing by human not only consumes lots of manpower and money, but also fails to obtain an accurate assessment finally since human feeling cannot be assessed by a numerical value.

SUMMARY OF THE DISCLOSURE

In view of the above-mentioned problems in the related art, embodiments of the present disclosure are directed to providing a method, a device and a system for game difficulty assessment, that substantially obviate one or more defects in the prior art and at least provide a beneficial selection.

In order to realize the above object of the present disclosure, the embodiments of the present disclosure provide the following aspects.

According to one aspect of the present disclosure, there is provided a method for difficulty assessment of computer game, including:

recording game data by a data collector in a process of simulating game playing by operating a computer game through an API (Application Programming Interface) of the computer game using an agent algorithm;

measuring a goal attainment difficulty of the computer game at each decision-making timing according to goal completion degrees of a plurality of goals corresponding to all attempts at each decision-making timing in the recorded game data;

measuring a strategy space-related difficulty of the computer game at each decision-making timing according to goal completion degrees of a plurality of goals corresponding to all actions at each decision-making timing in the recorded game data;

assessing difficulty of the computer game based on a goal attainment difficulty and a strategy space-related difficulty at each timing.

In some embodiments, the step of measuring a goal attainment difficulty of the computer game at each decision-making timing according to goal completion degrees of a plurality of goals corresponding to all attempts at each decision-making timing in the recorded game data includes: according to the recorded game data, acquiring a set of goal completion degrees of each goal corresponding to all attempts at each decision-making timing; obtaining an average value and a maximum value of difficulty related to the goal completion degree of each goal based on the set of goal completion degrees of each goal; and assessing a goal attainment difficulty of the computer game at respective decision-making timing based on the average value and the maximum value of the difficulty related to the goal completion degree of each goal.

In some embodiments, the step of measuring a strategy space-related difficulty of the computer game at each decision-making timing according to goal completion degrees of a plurality of goals corresponding to all actions at each decision-making timing in the recorded game data includes: acquiring a set of goal completion degrees of each goal corresponding to each action at each timing according to the recorded game data; calculating an average value and a maximum value of the goal completion degree of respective goal corresponding to each action; calculating standard deviations of the average value and the maximum value of the goal completion degree of respective goal corresponding to all actions; assessing a strategy space-related difficulty of the computer game at each timing based on the standard deviation of the average value and the standard deviation of the maximum value.

In some embodiments, the step of assessing difficulty of the computer game based on a goal attainment difficulty and a strategy space-related difficulty at each timing includes: assessing the difficulty of the computer game based on the following formula: $D=\Sigma_{t=0}^{T}(C_G \times D_G^t + C_S \times D_S^t)$; where D represents the difficulty of the computer game, represents the goal attainment difficulty at the decision-making timing t, $D_S^t$ represents the strategy space-related difficulty at the decision-making timing t, $C_G$ is a coefficient of $D_G^t$ affecting the difficulty, $C_S$ is the coefficient of $D_S^t$ affecting the difficulty, and T is a final decision-making timing.

In some embodiments, $D_G^t$ meets the following formula:

$$D_G^T = \Sigma_{g_j=g_1}^{g_z} C_{g_j}^{-1} \times [\Phi(a_{\hat{f}}, \lambda_a) + \Phi(m_{\hat{f}}, \lambda_m)]|_{g_j},$$

where, $C_{g_j}^1$ is a difficulty adjusting coefficient;

$\Phi(a_{\hat{f}}, \lambda_a)$ and $\Phi(m_{\hat{f}}, \lambda_m)$ are non-linear functions of $a_{\hat{f}}$ and $m_{\hat{f}}$ respectively, where $\lambda_a$ and $\lambda_m$ are non-linear coefficients of $a_{\hat{f}}$ and $m_{\hat{f}}$ respectively;

$a_{\hat{f}} = \text{avg}(S_{\hat{f}})|_{g_j}$, which represents an average value of the set of difficulties related to goal completion degree of the jth goal;

$m_{\hat{f}} = \max(S_{\hat{f}})|_{g_j}$, which represents a maximum value of the set of difficulties related to goal completion degree of the jth goal;

$S_{\hat{f}} = \{\hat{f}_1(g_j), \hat{f}_n(g_j), \ldots, \hat{f}_N(g_j)\}|_{g_j}$, which represents the set of difficulties related to goal completion degree of the jth goal, $\hat{f}(g_j) = 1 - f(g_j)$;

$f(g_j) = g_{c_j}/g_{t_j}$, which represents the goal completion degree of the jth goal;

$g_j$ is the jth goal in the set $G = \{g_1, g_2, \ldots, g_j, \ldots, g_z\}$ of all goals during game playing, $g_{c_j}$ represents the actual level of completion for the jth goal at current timing, $g_{t_j}$ represents the final required level of completion for the jth goal.

In some embodiments, $D_S^t$ meets the following formula:

$$D_S^T = \Sigma_{g_j=g_1}^{g_z} C_{g_j}^{-1} \times [\sigma(a_{\hat{f}}, \lambda_a) + \sigma(m_{\hat{f}}, \lambda_m)]|_{g_j};$$

where:

$C_{g_j}^2$ is a difficulty adjusting coefficient;

$A_i$ is a set of all actions at the timing i;

$\alpha_f^{Ai} = \{\alpha_f^{\alpha 1}, \alpha_f^{\alpha 2}, \ldots, \alpha_f^{\alpha 1}, \ldots, \alpha_f^{\alpha K}\}$, where K is a number of actions;

$m_f^{Ai} = \{m_f^{\alpha}, m_f^{\alpha 2}, \ldots, m_f^{\alpha k}, \ldots, m_f^{\alpha K}\}$;

$a_{\hat{f}} = \text{avg}(S_{\hat{f}})|_{g_j}$, which represents the average value of the set of goal completion degrees of the goal $g_j$ corresponding to the action $a_k$ at the timing t=i, where $S_f^{a_k}$ represents a set of goal completion degrees of the obtained goal $g_j$ by all attempts after the action $a_k$ is selected;

$m_f^{a_k} = \max(S_f^{a_k})|_{g_j}$, which represents the maximum value of the set of goal completion degrees of the goal $g_j$ corresponding to the action $a_k$ at the timing t=i;

$\sigma(a_f^{Ai})$ represents the calculation of a standard deviation for $a_f^{Ai}$; $\sigma(m_f^{Ai})$ represents the calculation of a standard deviation for $m_f^{Ai}$.

In some embodiments, the Agent algorithm is a randomized algorithm, a Monte Carlo Tree algorithm or a strategy gradient algorithm.

Another aspect of the present disclosure further provides a device for computer game difficulty assessment, including:

a difficulty assessment unit, for receiving game data collected by a data collector, wherein the game data is generated when game playing is simulated by operating a computer game through an API (Application Programming Interface) of the computer game using an agent algorithm, and the difficulty assessment unit is configured to perform the following processing:

measuring a goal attainment difficulty of the computer game at each decision-making timing according to goal completion degrees of a plurality of goals corresponding to all attempts at each decision-making timing in the recorded game data;

measuring a strategy space-related difficulty of the computer game at each decision-making timing according to goal completion degrees of a plurality of goals corresponding to all actions at each decision-making timing in the recorded game data;

assessing difficulty of the computer game based on a goal attainment difficulty and a strategy space-related difficulty at each timing.

Another aspect of the present disclosure further provides a system for computer game difficulty assessment, including:

an operating unit, which simulates game playing by operating a computer game through an API (Application Programming Interface) of the computer game using an Agent algorithm;

a data collector, which collects game data when the operating unit simulates game playing;

a difficulty assessment unit, configured to perform the following processing:

measuring a goal attainment difficulty of the computer game at each decision-making timing according to goal completion degrees of a plurality of goals corresponding to all attempts at each decision-making timing in the recorded game data;

measuring a strategy space-related difficulty of the computer game at each decision-making timing according to goal completion degrees of a plurality of goals corresponding to all actions at each decision-making timing in the recorded game data;

assessing difficulty of the computer game based on a goal attainment difficulty and a strategy space-related difficulty at each timing.

Another aspect of the present disclosure further provides a computer storage medium, on which a computer program code is stored. When the computer program code is executed, the above-mentioned method for computer game difficulty assessment is implemented.

Using the method, device and system for computer game difficulty assessment according to the present disclosure, human intervention is not needed in the process of assessing game difficulty. With the Agent algorithm, the game content may be played automatically and the game data is recorded automatically. For the recorded game data, it is possible to generate the difficulty assessment result automatically from a plurality of aspects by the algorithm. Since during a period of time, the number of times of playing the game content using the Agent algorithm is greater than the number of times of playing the game content by human players, the time and manpower may be saved greatly, and the assessment is ensured to be more accurate. In addition, the final assessment result may be presented in a numerical value to quantize the whole process, during which, since human is not needed, the result is not affected by human emotion.

Persons skilled in the art shall understand that the objects and advantages implemented by the present disclosure are not limited to the foregoing, and may clearly understand that the present disclosure may realize the above-mentioned and other objects according to the following detailed description.

It should be noted that the foregoing and following detailed descriptions are merely illustrative, and not construed as limitations to the claimed contents of the present disclosure.

BRIEF DESCRIPTION OF THE DRAWINGS

The embodiments of the present disclosure will be explained below in combination with drawings, and the above and other objects, features and advantages of the present disclosure will be understood easily.

DETAILED DESCRIPTION OF THE EMBODIMENTS

Figure 1:
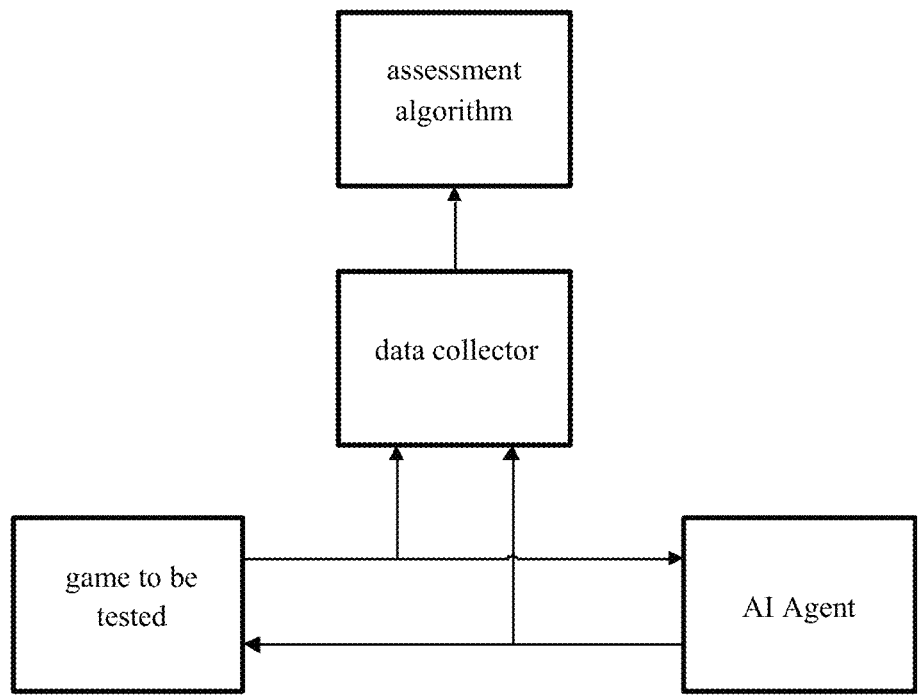
FIG. 1 is a principle diagram of a method for computer game difficulty assessment according to some embodiments of the present disclosure.

With reference to the following drawings, the embodiments of the present disclosure are explained. In the description and drawings, the illustrate embodiments of the present disclosure are disclosed in detail, and the principle of the present disclosure and the manners of use are indicated. It should be understood that the scope of the present disclosure is not limited thereto. The present disclosure contains many alternations, modifications and equivalents within the spirits and scope of the terms of the appended claims.

It shall be noted that a representation and a description of components and processes irrelevant to the disclosure and well known to those ordinarily skilled in the art will be omitted in the drawings and the description for the sake of clarity.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

In order to solve the problem in the prior art, in the present disclosure, the Agent algorithm is used to test the game automatically, the possible situations encountered by the player during the game are analyzed using the game data collected during the test, and the game difficulty assessment result is generated dynamically by the numerical value information obtained during the game.

The process of a human player or an AI (Artificial Intelligence) Agent playing the game to be tested may be considered as a process of making a series of decisions by the player or the Agent with respect to the game state. In the present disclosure, for the human player or the AI Agent, each timing when actions are needed to be selected as t=0, 1, 2, . . . , i, . . . , T, where T represents the final timing of the game. At a certain timing t=i, the game will provide the player or the Agent with the current state $s_i$ of the game and the set of $K_i$ actions which are executable currently $A_i=\{a_1, a_2, \ldots, a_k, \ldots, a_{K_i}|t=i\}$. The action strategy $$\pi(s_i) = \{p_{a_1}, p_{a_2}, \ldots, p_{a_k}, \ldots, p_{a_{K_i}} | s_i\}$$

of the player or the Agent is defined as the possibility of the player or the Agent taking each action in the current state. The player or the Agent will take the corresponding action according to the action strategy. After the player or the Agent selects the action, the game gives back the corresponding stimulation $r_{i+1}$ which may be positive or negative. The game will reach a new timing t=i+1 due to the selection of the player or the Agent, obtaining a new state $s_{i+1}$ and a set of executable actions $A_{i+1}$. For the human player, the game provides a GUI (Graphical User Interface). For the AI Agent, the game needs to provide a series of APIs (Application Programming Interface), so that the Agent algorithm can select actions using the API, thereby changing the current state of the game.

FIG. 1 is a principle diagram of a method for computer game difficulty assessment according to some embodiments of the present disclosure. As shown in FIG. 1, the Agent algorithm interacts with the game to be tested through the API by simulating human playing the game, during which an Graphical User Interface is not needed. During the interaction, the data collector monitors and collects game data. After the game is played once or many times, the data collector would collect the process and result of all attempts made by the Agent algorithm, and then a data analyzing and assessing algorithm (simply referred to as assessment algorithm) would assess a goal attainment difficulty and a strategy space-related difficulty of the game based on the process and result of all attempts, and calculate the game difficulty based on the goal attainment difficulty and strategy space-related difficulty of the game which may reflect the game difficulty.

In the game content a series of goals are set. The process of playing game may be defined as the process that the player obtains the stimulation provided by the game by achieving a series of goals. The degree of the player achieving a series of goals may reflect the game difficulty, while the game stimulation may affect the strategy and gaming experience of the player. In the present disclosure, the main principle of the difficulty assessment algorithm is to measure the game difficulty by measuring the goal completion degree of the player during the game playing and the strategy space of the player.

Figure 2:
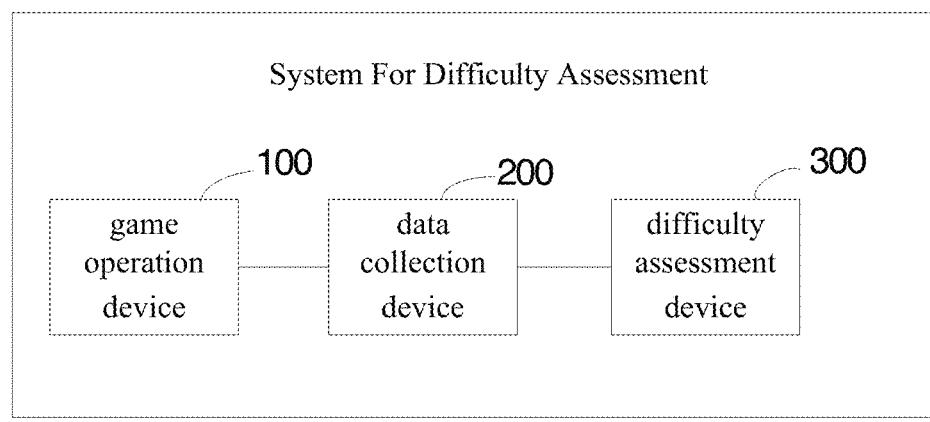
FIG. 2 is a schematic block diagram of a system for game difficulty assessment according to some embodiments of the present disclosure.

In some embodiments of the present disclosure, the Agent algorithm, the data collection and the difficulty assessment algorithm may be implemented on different hardware equipment, for example, on a plurality of computers, each of which has a storage and a processor. As an example, in a system for implementing a game difficulty assessment method according to the present disclosure as shown in FIG. 2, the Agent algorithm may be executed on the processor of the first computer (game operation device 100). The computer game to be tested may be stored in a local or remote device, and the game operation device 100 may locally or remotely operate the computer game by the API, thereby simulating the process of playing the game. The operation of collecting game data may be implemented on the processor of the second computer (data collection device 200), and the data collection device 200 may have access to the Agent algorithm and the computer game by the API via a wireless or wired interface, thereby obtaining the game data. The assessment algorithm may be implemented on the processor of the third computer (difficulty assessment device 300), the difficulty assessment device 300 is connected with the data collection device 200 via wireless or wired means, the game data is received from the data collection device 200, and the game difficulty assessment is performed based on the game data.

In another embodiment of the present disclosure, the game operation device 100 and the data collection device 200 are integrated in one computer, and are implemented by executing the corresponding computer software in the processor of the computer.

In another embodiment of the present disclosure, the game operation device 100, the data collection device 200 and a device for difficulty assessment 300 are integrated in one computer, and are implemented by executing the corresponding computer software in the processor of the computer.

In another embodiment of the present disclosure, the Agent algorithm may also executed on processors of a plurality of computers simultaneously, the data processing device may obtain game data from the plurality of computers, and transmits the same to the device for difficulty assessment, and the device for difficulty assessment performs difficulty assessment based on the obtained game data.

Figure 3:
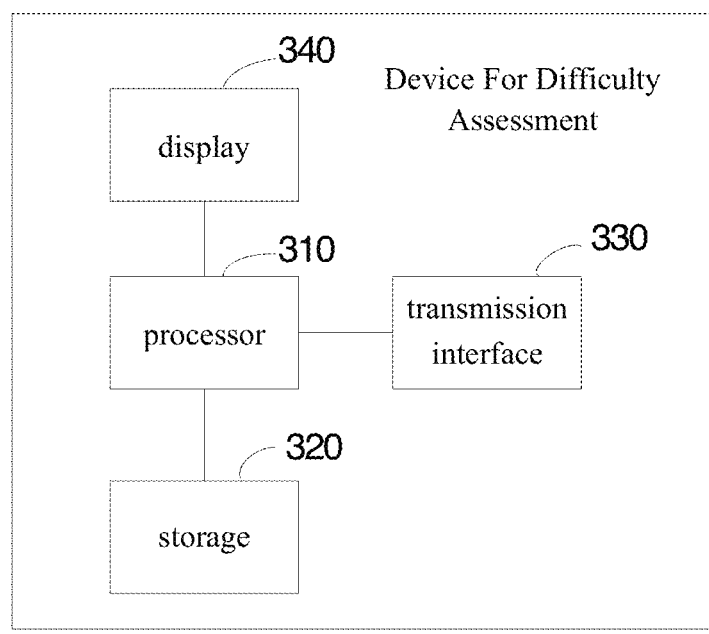
FIG. 3 is a schematic block diagram of a device for game difficulty assessment according to some embodiments of the present disclosure.

FIG. 3 shows a schematic block diagram of a device for difficulty assessment 300 according to one embodiment of the present disclosure. As shown in FIG. 3, the device for difficulty assessment 300 may include a processor 310, a storage 320, a transmission interface (wired interface or wireless network interface) 330 and a display 340. The storage 320 is used for storing a difficulty assessment algorithm, the processor 310 is used for executing the difficulty assessment algorithm, and the transmission interface 330 is used for communicating with an external device, so as to transmit data such as game data. The display 340 is used for displaying difficulty assessment results. The structure shown in FIG. 3 is merely an example, and may include more or less parts.

Figure 4:
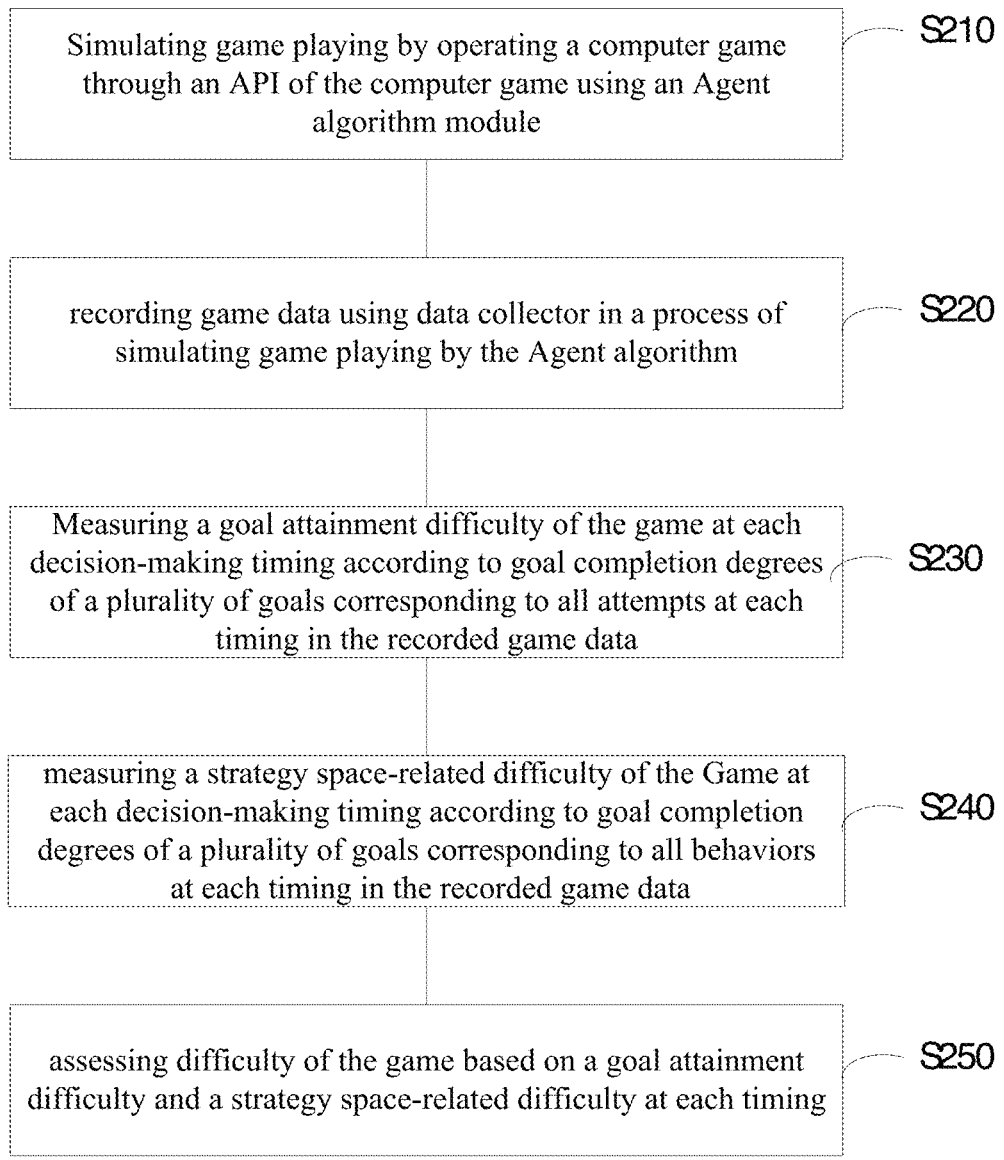
FIG. 4 is a flow chart of a method for computer game difficulty assessment according to some embodiments of the present disclosure.

FIG. 4 is a flow chart of a method for computer game difficulty assessment according to some embodiments of the present disclosure. As shown in FIG. 4, the method includes steps S210 to S250.

In step S210, the process of playing game is simulated by operating a computer game through an API (Application Programming Interface) of the computer game using an agent algorithm.

Specifically, the Agent algorithm selects the action in the game via a series of APIs of the game, and changes the current state of the game.

In the embodiment of the present disclosure, there is a variety of Agent algorithms. The Agent algorithm closest to the strategy used by human playing the game may generate the most accurate difficulty assessment close to the human experience. The Agent algorithm may be for example, randomized algorithms or various reinforcement learning algorithms, but not limited thereto. The simplest Agent algorithm therein may be considered as the randomized algorithms, which select one action randomly from all sets of actions at a certain decision-making timing, without considering any current state or future goal. Certainly, if the game playing process generated by such an Agent algorithm is used, the obtained difficulty by assessment may be higher than that experienced by human. That is, when the Agent considers the game content to be relatively difficult, human would consider it to be relatively easy. Similarly, when the game is played using the Agent algorithm with a high standard, if this Agent algorithm is superior to human, the game content is easier for the Agent algorithm than for human. The Agent algorithm may also be implemented by various algorithms of reinforcement learning, and is not limited. The reinforcement learning method such as a Monte Carlo Tree search algorithm may also be taken as the Agent algorithm. For the Agent algorithm, a strategy gradient algorithm, such as A3C, PPO, or the like may also be used. The present disclosure is not limited to the listed Agent algorithms. It should be noted that, the Agent algorithm needs a possibility strategy, rather than a determined strategy. The attempt of the Agent needs to be used to simulate the attempt of human, if the strategy is fixed, the process of selecting the action is fixed, and thus diversified attempt results cannot be generated.

Herein, the Agent algorithm is illustrated. The simplest algorithm in the Agent algorithms is the randomized algorithm. The randomized algorithm may be described as follows. In the current state $s_i$, the possibility $p_{a_k}$ of each action in the action strategy $$\pi(s_i) = \{p_{a_1}, p_{a_2}, \ldots, p_{a_k}, \ldots, p_{a_{K_i}} | s_i\}$$

of the Agent is the same.

Since the Agent algorithm needs to simulate the operation of a group of players, playing a game only once is not sufficient to obtain enough data to analyze the difficulty assessment algorithm. Therefore, when the Agent algorithm is used practically, the following way is used.

At the timing t=i of the game X, the Agent will attempt by N times. In the nth (n=1, 2, 3, . . . , N) attempt, the Agent may select one action from the set $A_i$ of executable actions according to the current state $s_i$ and the strategy $\pi(s_i)$, executes this action in another game Y simulated separately, and then this simulated game reaches the timing t=i+1 and obtains the state $s_{i+1}$. Then, Agent keeps executing the action in the game $Y_n$ according to the strategy $\pi(s_{i+1})$, until the game $Y_n$ ends. After N attempts end, the Agent would make decisions according to the result of each game $Y_n$, and decide the action at the timing t=i of the game X.

For the MCTS (Monte Carlo Tree Search) algorithm, the Agent may make decisions according to the result of each game $Y_n$. For the randomized strategy algorithm, the Agent is not affected by the result of the game $Y_n$ since this algorithm selects the action randomly. After the Agent makes decisions, the game X reaches the timing t=i+1. The Agent algorithm repeats the above-mentioned steps, and new decisions are made after N attempts, until the game X ends.

In step S220, in the process of the Agent algorithm simulating playing game, the data collector records game data.

This game data may include for example, the strategy executed by the Agent algorithm, all attempts, the game state, or the like, where the game state includes the goal completion degree of the game.

In step S230, a goal attainment difficulty of the computer game at each decision-making timing is measured according to goal completion degrees of a plurality of goals corresponding to all attempts at each decision-making timing in the recorded game data.

During game simulation, the goal completion degree in each attempt may reflect the game difficulty to some extents. Therefore, in this step, the goal completion degrees of a plurality of goals corresponding to all attempts at each decision-making timing may be quantized, so as to measure the difficulty reflected by the goal completion degree of the game at each timing. For example, $D_G^t$ may be used to represent the difficulty reflected by the goal completion degree in the game difficulty assessment process, i.e., the goal attainment difficulty.

In the embodiment of the present disclosure, $D_G^t$ may be denoted by various expressions. For example, a set of goal completion degrees of each goal corresponding to all attempts at each decision-making timing is acquired based on the recorded game data; an average value and a maximum value of the goal completion degree of each goal is obtained based on the set of goal completion degrees of each goal; and then a goal attainment difficulty of the computer game at respective decision-making timing is measured based on the average value and the maximum value of the goal completion degree of each goal. There may be various ways for measuring a goal attainment difficulty of the computer game at respective timing based on the average value and the maximum value of the goal completion degree of each goal, and the example of the expression formula will be given hereinafter.

In step S240, according to goal completion degrees of a plurality of goals corresponding to all actions at each decision-making timing in the recorded game data, a strategy space-related difficulty of the computer game at respective timing.

The strategy space refers to a set of strategies and a set of results achieved by the strategy in the process of the player selecting actions. The more the selectable strategies, the larger the strategy space is. Similarly, the more diverse the achievable results, the larger the strategy space is. The strategy space-related difficulty is the difficulty reflected by selecting the action strategy faced by the player (including Agent) during the game, or the difficulty related to the strategy space.

In this step, the goal completion degrees of a plurality of goals corresponding to all attempts at each decision-making timing are quantized, so as to measure the goal attainment difficulty of all actions at each timing. For example, $D_S^t$ may be used to represent the difficulty generated by the strategy space of the player during the game, i.e., the strategy space-related difficulty.

In the embodiment of the present disclosure, $D_S^t$ may be denoted by various expressions. For example, $D_S^t$ may be determined by the following steps. Firstly, a set of goal completion degrees of each goal corresponding to all attempts at each decision-making timing is acquired according to the recorded game data. Then, an average value and a maximum value of the goal completion degree of each goal corresponding to each action is calculated. Standard deviations of the average value and the maximum value of the goal completion degree of each goal corresponding to all actions are calculated. And then, a strategy space-related difficulty of the computer game at this timing is calculated based on the standard deviation of the average value and the standard deviation of the maximum value. There may be various ways for calculating a strategy space-related difficulty of the computer game at respective timing based on the standard deviation of the average value and the standard deviation of the maximum value, and the example of the expression formula will be given hereinafter.

In step S250, the difficulty of the computer game is assessed based on a goal attainment difficulty and a strategy space-related difficulty of each timing.

One simple way is to use the following formula to represent the game difficulty:

$$D = \sum_{t=0}^{T}(C_G \times D_G^t + C_S \times D_S^t) \tag{1}$$

where, D represents game difficulty, including two parts, wherein $D_G^t$ represents the goal attainment difficulty of the game at the decision-making timing t during the game, and $D_S^t$ represents the strategy space-related difficulty of the game at the decision-making timing t during the game. The formula (I) means that the game difficulty has positive correlation with $D_G^t$ and $D_S^t$. $C_G$ is a coefficient of the factor $D_G^t$ influencing the difficulty, and $C_S$ is a coefficient of the factor $D_S^t$ influencing the difficulty. An overall assessment result D is obtained by synthesizing the difficulty assessed at each decision-making timing.

This formula (1) is merely an example, and is not limited thereto in the present disclosure. The formula (1) may be flexibly transformed or other factors to be considered may be added appropriately.

Hereinafter, the exemplary expressions of DC and DI are given by example.

Firstly, $G=\{g_1, g_2, \ldots, g_j, \ldots, g_z\}$ is defined, which represents a set of all goals in the process of playing game. One assessment function $f(g_j)$ of the goal completion degree is defined, and represents the goal completion degree $f$. The assessment function of the goal completion degree may have many expression forms. The simplest form may be represented using the following formula:

$$f(g_j)=g_{c_j}/g_{t_j} \tag{2}$$

where $g_j$ is the jth goal contained in the game content, $g_{c_j}$ represents the actual level of completion for the jth goal at current timing, and $g_{t_j}$ represents the final required level of completion for the jth goal. This formula may represent the completion degree of actual completion level for the goal $g_j$ at the current timing with respect to desired completion level of the goal $g_j$.

Usually, a positive stimulation of the game is related to the goal completion degree, and the experience of playing game is also related to the goal completion degree. For the decision-making timing t=i, all the attempt results are analyzed, so as to obtain a set of the goal completion degrees of the goal $g_j$ corresponding to all attempts. The goal completion degree achieved by the nth attempt is defined as $f_n(g_j)$, and the set consisting of N attempts is $S_f = \{f_1(g_j), f_2(g_j), \ldots, f_n(g_j), \ldots, f_N(g_j)\}|_{g_j}$.

The average value of this set is calculated, so as to obtain $a_f = \text{avg}(S_f)|_{g_j}$, which is the average value of the goal completion degrees of all attempts. The maximum value of this set is calculated, so as to obtain $m_f = \max(S_f)|_{g_j}$, which is the maximum value of the goal completion degrees of all attempts For most games, the less $f(g_j)$, the larger the difficulty is. Such an inverse ratio relation may be represented in many forms. $\hat{f}(g_j) = 1 - f(g_j)$ may be defined to represent the difficulty related to the goal completion degree of each attempt. Alternatively, other forms may be adopted to represent the difficulty related to the goal completion degree of each attempt. For example, a reciprocal relationship is used to reflect the relation between the goal completion degree and the difficulty related to the goal completion degree. Similarly, the set $S_{\hat{f}} = \{\hat{f}_1(g_j), \hat{f}_2(g_j), \ldots, \hat{f}_n(g_j), \ldots, \hat{f}_N(g_j)\}|_{g_j}$ of the difficulties related to the goal completion degree of all attempts may be obtained. For this set, the average value is calculated, so as to obtain the average value of the difficulties related to the goal completion degrees of all attempts $a\hat{f} = \text{avg}(S_{\hat{f}})|_{g_j}$. For this set, the maximum value is calculated, so as to obtain the maximum value of the difficulties related to the goal completion degrees of all attempts $m_{\hat{f}} = \max(S_{\hat{f}})|_{g_j}$.

Here, the attainment difficulty $D_G^t$ of the goal g of the game during the game is obtained according to $a_{\hat{f}}$ and $m_{\hat{f}}$ by using an exemplary non-linear function $\Phi(x, \lambda) = x^\lambda$ (where $\lambda$ is the non-linear coefficient).

As one exemplary embodiment, $D_G^t$ may be calculated using the following formula:

$$D_G^t = \sum_{g_j=g_1}^{g_l} C_{g_j}^1 \times [\Phi(a_{\hat{f}}, \lambda_a) + \Phi(m_{\hat{f}}, \lambda_m)]\Big|_{g_j} \quad (3)$$

For the goal attainment difficulty $D_G^t$ generated by assessing the overall goal completion degree, it is necessary to do statistics on the influence of the completion degree of each goal $g_j$ on the difficulty felt by the players. The formula (3) means the influence of the average completion degree and the best completion degree of the goal on the game difficulty at the timing t=i. $C_{g_j}^1$ is the difficulty adjusting coefficient, for adjusting the influence of each goal on the game difficulty. The numerical value of $C_{g_j}^1$ may be flexibly set according to the design purpose of the specific game. For example, in the case of a principal goal and a secondary goal in the game, when $g_j$ is the principal goal, the value of $C_{g_j}^1$ may be higher than that when $g_j$ is the secondary goal.

It should be noted that $a_{\hat{f}}$ and $m_{\hat{f}}$ are introduced by using the non-linear form $\Phi(a_{\hat{f}}, \lambda_a)$ and $\Phi(m_{\hat{f}}, \lambda_m)$ in the formula (3), so as to reflect the non-linear relation between the goal attainment difficulty and the goal completion degree. For example, for two goal completion degrees $f_1(g_j)$ and $f_2(g_j)$, when these two values are low, human feels larger difficulty difference than the case these two values are high. However, the present disclosure is not limited thereto, and other forms may be used to reflect the influence of $a_{\hat{f}}$ and $m_{\hat{f}}$. For example, the non-linear expression of $\Phi(x) = \log(x+1)$ is defined to reflect the non-linear relation between the goal attainment difficulty and the goal completion degree.

Hereinafter, by example, the strategy space-related difficulty $D_S^t$ in the game process is given.

The set of all previous attempts may be classified according to action, and $S_f^{a_k} = \{f_1(g_j), f_2(g_j), \ldots, f_n(g_j), \ldots, f_N(g_j) | a = a_k\}|_{g_j}$ may be obtained. This represents the attempt after all the executable actions $a_k$ are selected, and the set of the goal completion degree of the goal $g_j$ corresponding to all actions is obtained. For this set, the average value is calculated, so as to obtain the average value of the goal completion degrees of the goal $g_j$ corresponding to all actions: $a_f^{a_k} = \text{avg}(S_f^{a_k})|_{g_j}$. For this set, the maximum value is calculated, so as to obtain the maximum value of the goal completion degrees of the goal $g_j$ corresponding to all actions: $m_f^{a_k} = \max(S_f^{a_k})|_{g_j}$.

As one example, $D_S^t$ may be calculated using the following formula:

$$D_S^t = \sum_{g_j=g_1}^{g_l} C_{g_j}^2 \times [\sigma(\alpha_f^{A_i}) + \sigma(m_f^{A_i})]\Big|_{g_j} \quad (4)$$

Where $A_i$ is a set of all actions defined at the timing t=i, and $\sigma(x)$ represents the calculation of standard deviation for data x (for example, $\sigma(a_f^{A_i})$ represents the calculation of standard deviation for $a_f^{A_i}$; $\sigma(m_f^{A_i})$ represents the calculation of standard deviation for $m_f^{A_i}$). $\alpha_f^{A_i} = \{\alpha_f^{\alpha_1}, \alpha_f^{\alpha_2}, \ldots, \alpha_f^{\alpha_k}, \ldots, \alpha_f^{\alpha_K}\}$, where K is a number of actions; $m_f^{A_i} = \{m_f^{\alpha_1}, m_f^{\alpha_2}, \ldots, m_f^{\alpha_k}, \ldots, m_f^{\alpha_K}\}$. The difference of completion degrees between all executable actions at the current timing is measured by the standard deviation. For example, there are five executable actions at the current timing, and different goal completion degrees of goal $g_j$ may be obtained from the final results after the selection of respective action. When there is a relatively big difference between action selections, the standard deviation is large, and the difficulty is relatively large. The average value and the maximum value respectively measure the average level and the best level of completing goal in this action selection. By synthesizing the completion degree of each goal, the difficulty of selecting action for the player at current timing may be measured. In the formula (4), $C_{g_1}^2$ is the difficulty adjusting coefficient, for adjusting the influence of each goal on the game difficulty. $C_{g_1}^2$ may be the same or different from $C_{g_1}^2$ in the formula (3).

In the preferable embodiment of the present disclosure, during the above-mentioned game difficulty assessment process, the data collected by the Agent algorithm, the assessed data which is generated in each stage of the assessment and represents the goal completion degree corresponding to all attempts, the goal completion degree data corresponding to all actions or the corresponding difficulty data, the final assessment result, or the like are visually displayed on a display in a form of a changing curve or a histogram, so as to intuitively display the assessment result of the present disclosure.

Based on the foregoing description on the assessment flow, it is known that the method for game difficulty assessment according to the present disclosure may solve various problems existing in the human assessment. The assessment process in the present disclosure does not need human participation. With the Agent algorithm, the game content may be played automatically by the processor and the game data is recorded. For the recorded game data, it is possible to generate the difficulty assessment result automatically from a plurality of aspects by the algorithm. The whole process does not have human participation and is executed automatically. Since during a period of time, the number of times of playing the game content using the Agent algorithm is greater than the number of times of playing the game content by human players, the time and manpower may be saved greatly, and the assessment is ensured to be more accurate. In addition, the final assessment result may be presented in a numerical value to quantize the whole process, during which, since human is not needed, the result is not affected by human emotion. Based on the method for game difficulty assessment according to the embodiments of the present disclosure, the game difficulty may be assessed objectively, thereby determining whether the assessed game difficulty conforms to the predicted difficulty level in the game development, and the game content may be adjusted correspondingly, and the game conforming to the predicted difficulty is developed more rapidly.

Figure 5:
FIG. 5 is a schematic diagram of a game interface of Kingdom Rush Frontier.

The game difficulty assessment algorithm according to the present disclosure will be explained using a Tower Defense Game as an example below. Kingdom Rush Frontier is a tower defense game in research, with a main aim to prevent enemies from reaching the exits of paths on the map by building defense towers based on given gold coins and the map, so as to win the levels of the game. Killing enemies earns gold coins, which may be used to purchase or upgrade existing towers. The player starts each level with 20 hearts. If an enemy escapes from an exit, the player's hearts count will be reduced. The game ends when the player eliminates all enemies or the player's hearts count decreases to 0. The GUI of the game is as shown in FIG. 5, from which, there is a heart-shaped label at the top left corner, and the number of 20 is shown, which represents that the player has 20 hearts. The later number of 202 represents the number of gold coins of the player, and the gold coins decide a set of actions of the player at a certain timing. 2/14 represents that the player is encountering the second group of monsters, and there are 14 groups of monsters in total. The player's aim is to prevent monsters from reaching the end points of paths by building different types of defense towers beside the path without losing any heart to the greatest extent. On this map, the end point is in the middle of the upper part.

In this game, the Agent also uses the way similar to human playing the game to operate the game. The action set of the Agent is defined as a set of positions which may be clicked on the screen. Human may build the defense tower to defend by clicking some positions on the screen, or using some techniques. The Agent may also build the defense tower or use techniques. For the timing t=i, the action in $A_i$ may be a coordinate of the operable defense tower, or a position which may use techniques. In FIGS. 8, 10, 14 and 16, the horizontal axis of the diagram for the action represents a position of the coordinate point which may be clicked by the Agent at the current timing.

Figure 6:
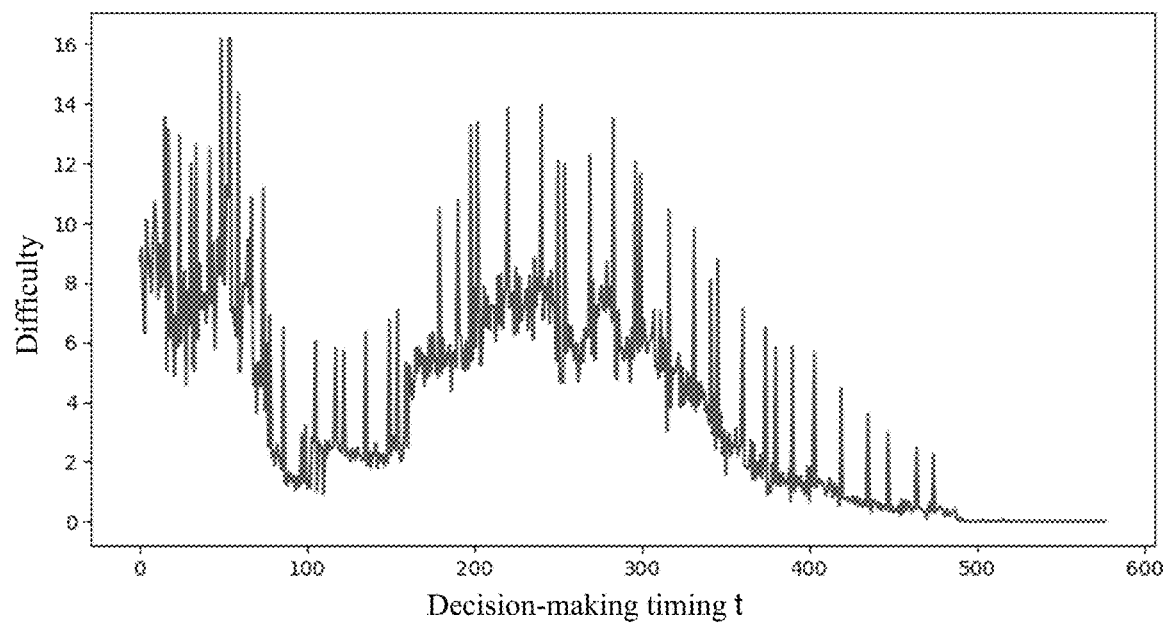
FIG. 6 is a schematic diagram of a difficulty curve generated by a difficulty assessment algorithm in the game example of FIG. 5.

After the content of this level shown in FIG. 5 is played, the difficulty curve generated by the difficulty assessment algorithm is as shown in FIG. 6. The horizontal axis shows a number of a selection made by the Agent when the content is played, and there are totally 577 selections by the Agent in this game playing. The Agent algorithm may be set to make a selection (i.e. to make a decision) once every 50 frames. When there is no selection to make, this timing will be skipped automatically. The vertical axis stands for the current difficulty value calculated by the difficulty assessment algorithm, i.e., $C_G \times D_G^t + C_S \times D_S^t$ in the formula (1). By synthesizing the difficulty at each decision-making timing, the present disclosure may obtain the overall difficulty. In FIG. 6, the game difficulty changes with a change in the game content.

FIGS. 7 to 16 are visualization of five groups of data collected by the Agent algorithm at five selected decision-making timings. FIGS. 7 and 8, FIGS. 9 and 10, FIGS. 11 and 12, FIGS. 13 and 14, and FIGS. 15 and 16 show five groups of views. Each group of view contains two diagrams, where the first diagram embodies the calculation process of the formula (3). The first diagram is a histogram of a number of hearts obtained after the Agent makes multiple attempts at a certain timing. The horizontal axis represents the degree of completing the goal, and the larger the abscissa value, the higher the goal completion degree is. The vertical axis shows the number of times of attempts which obtained such results. In the game process, the number of hearts of the player is the main goal of the player, and the goal completion degree for the same level also reflects the level of the player. The Agent will attempt different actions at a certain timing, and then the data collection system will collect the result after each attempt by the Agent.

The second diagram in each group embodies the calculation process of the formula (4). The second diagram shows the average number of hearts obtained after multiple attempts by the Agent for different actions at a certain timing. The horizontal axis shows the number of each action. The vertical axis stands for the average number of hearts obtained after multiple attempts by the Agent under this action. At each decision-making timing, the change in the number of actions which can be taken causes the change in the number of actions of the horizontal axis.

The decision-making timing of each group of diagrams also corresponds to the changing trend of the curve in FIG. 6.

Figure 7:
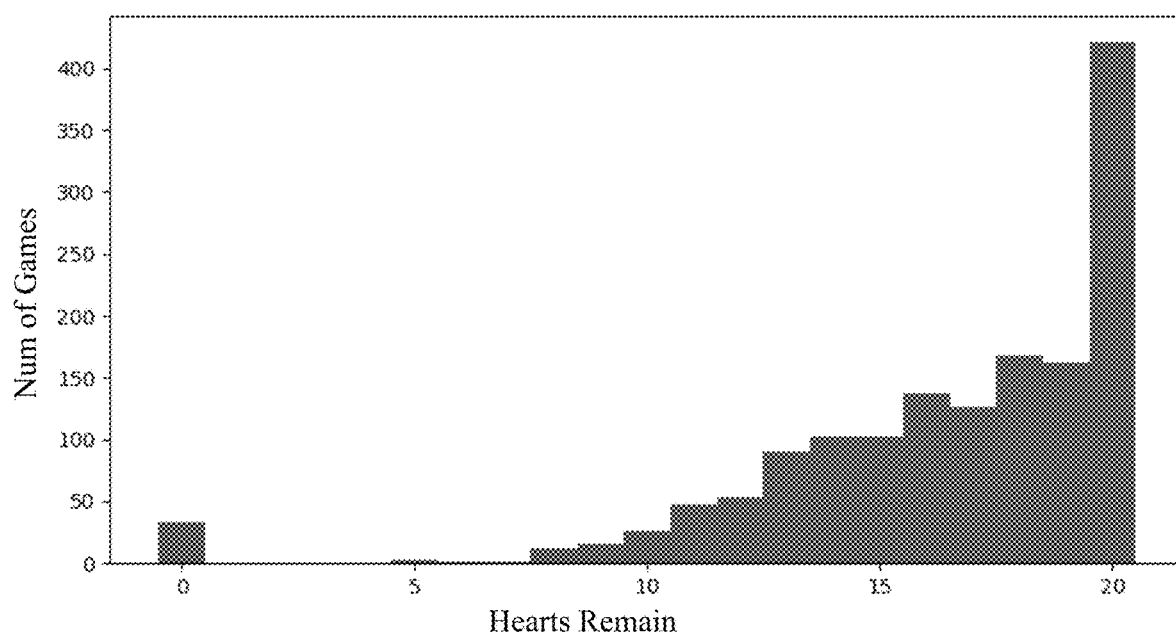
FIG. 7 is a histogram of a number of hearts obtained after many attempts by Agent at the fifteenth decision-making timing in the game example of FIG. 5.
Figure 8:
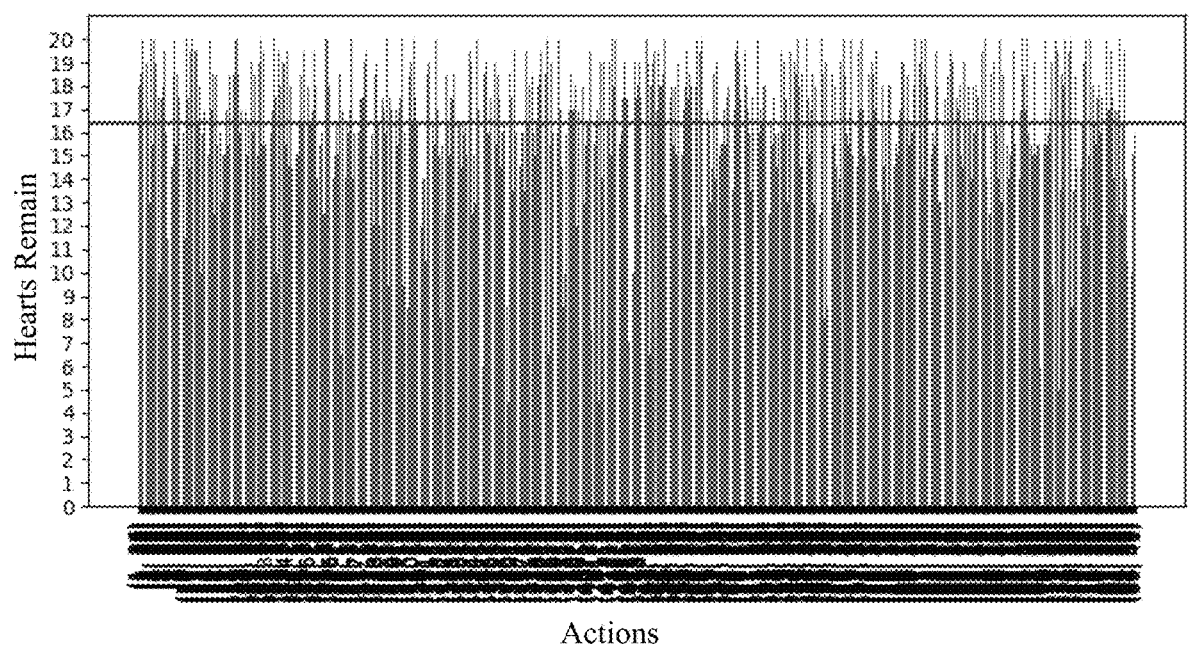
FIG. 8 is average number of hearts obtained after many attempts by Agent at the fifteenth decision-making timing in the game example of FIG. 5.

FIGS. 7 and 8 show a histogram of the number of hearts obtained after multiple attempts by the Agent and an average number of hearts at the fifteenth decision-making timing, respectively. In FIG. 7, in most cases, there are 20 hearts. FIG. 8 shows that there are many actions which may be made at the current decision-making timing, and that the results obtained by the actions have big different, so the value of $D_S$ is high.

Figure 9:
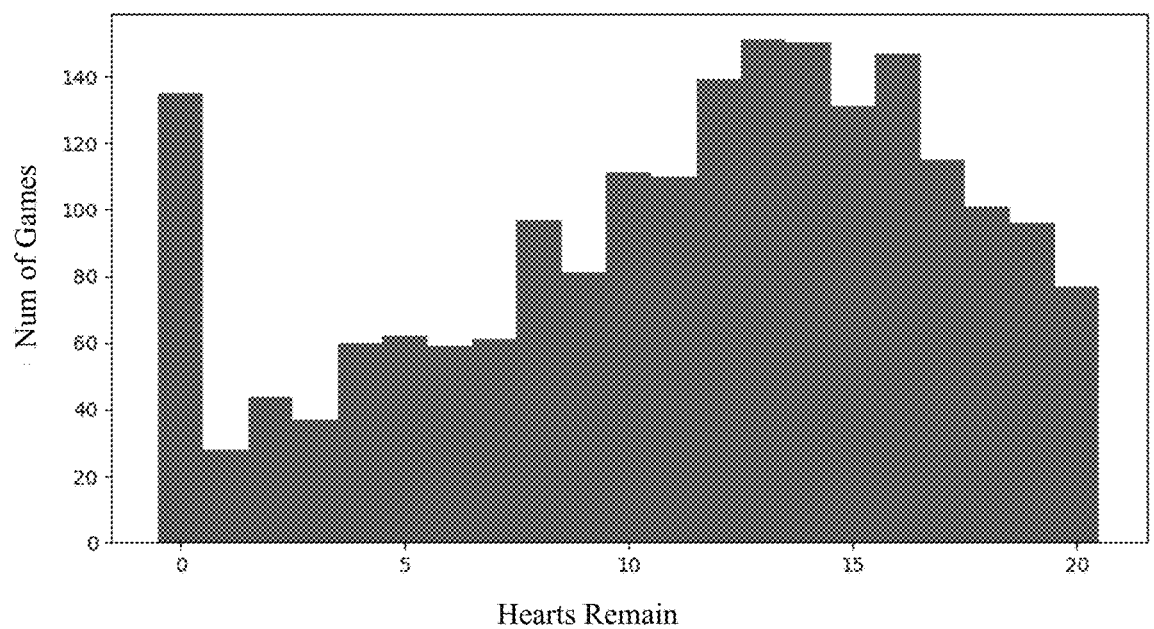
FIG. 9 is a histogram of a number of hearts obtained after many attempts by Agent at the sixty-second decision-making timing in the game example of FIG. 5.
Figure 10:
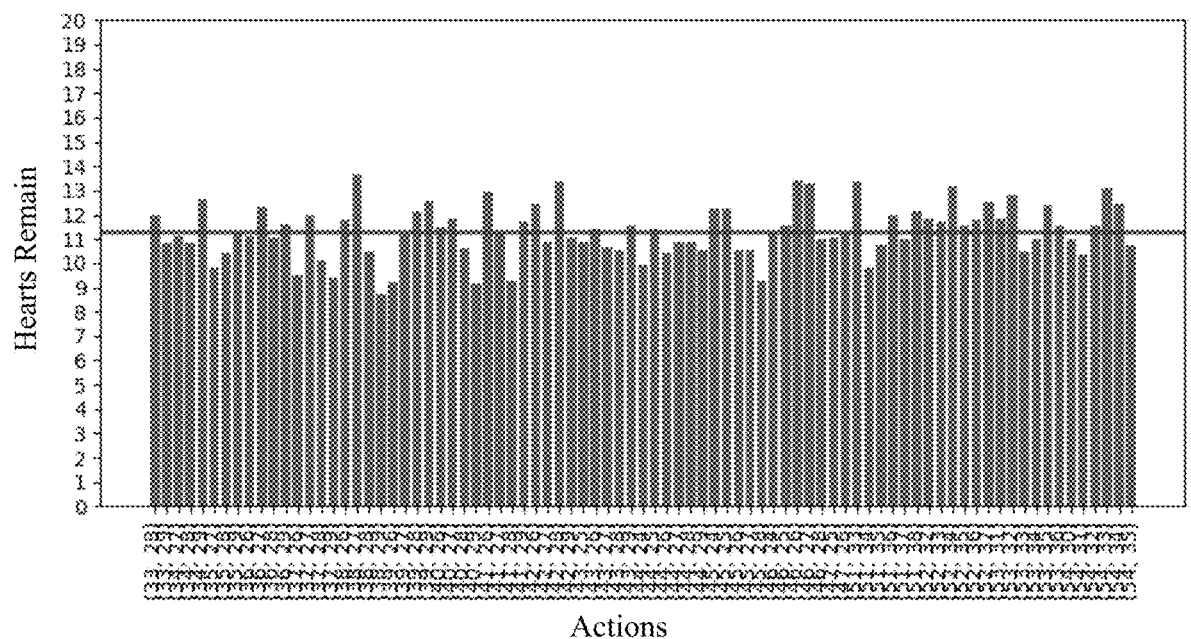
FIG. 10 is average number of hearts obtained after many attempts by Agent at the sixty-second decision-making timing in the game example of FIG. 5.

FIGS. 9 and 10 show a histogram of the number of hearts obtained after multiple attempts by the Agent and an average number of hearts at the sixtieth-second decision-making timing, respectively. In FIG. 9, there are many cases where the number of hearts is 0, and the value of $D_G$ is relatively large. In FIG. 10, there is less difference between selections, so the value of $D_S$ is relatively small.

Figure 11:
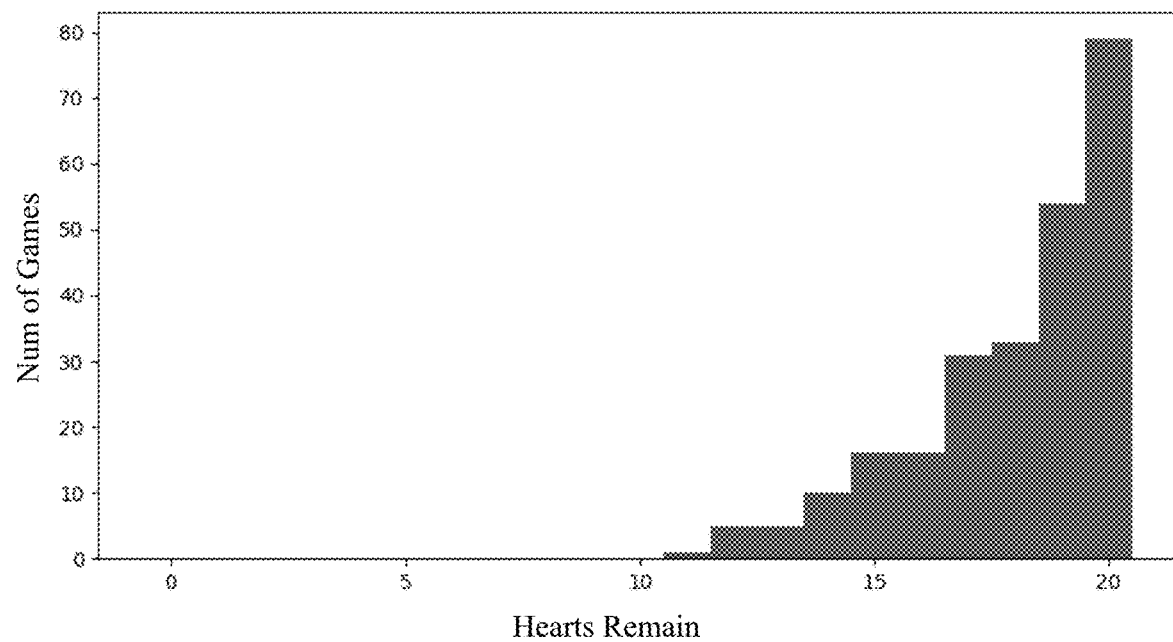
FIG. 11 is a histogram of a number of hearts obtained after many attempts by Agent at the one hundredth decision-making timing in the game example of FIG. 5.
Figure 12:
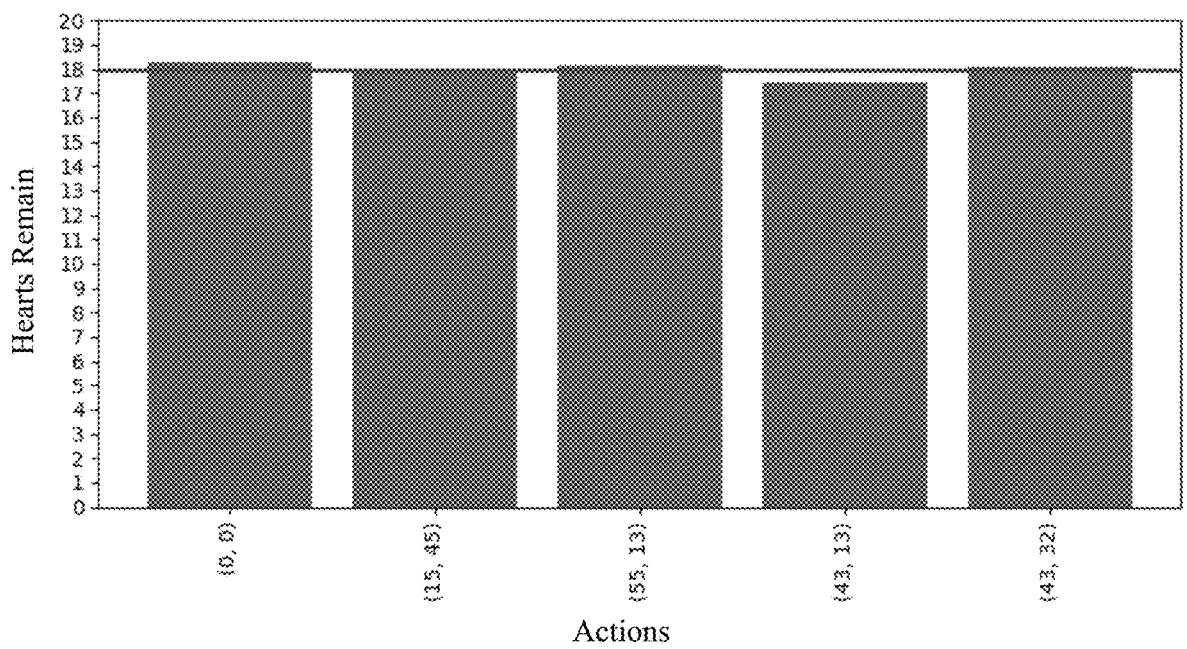
FIG. 12 is average number of hearts obtained after many attempts by Agent at the one hundredth decision-making timing in the game example of FIG. 5.

FIGS. 11 and 12 show a histogram of the number of hearts obtained after multiple attempts by the Agent and an average number of hearts at one hundredth decision-making timing, respectively. It is shown that at this timing, the result obtained by most attempts is 20 hearts, the selectable action at this timing is less, and the difficulty at this timing reduces, as showed on the curve in FIG. 6.

Figure 13:
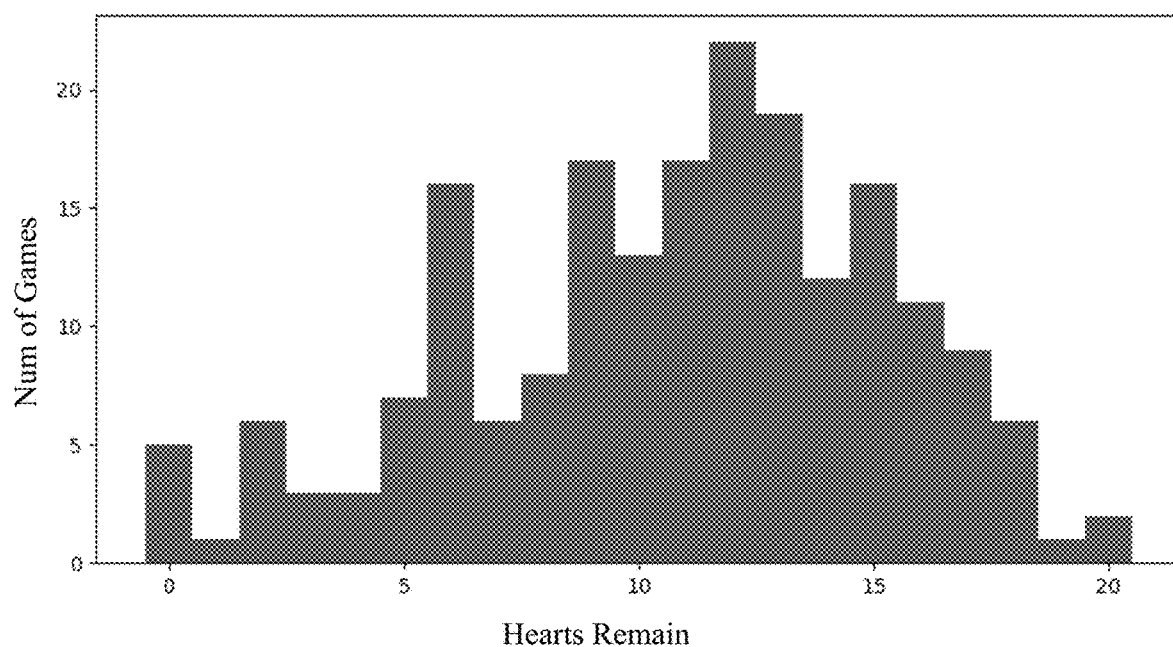
FIG. 13 is a histogram of a number of hearts obtained after many attempts by Agent at the two hundred and fifty fifth decision-making timing in the game example of FIG. 5.
Figure 14:
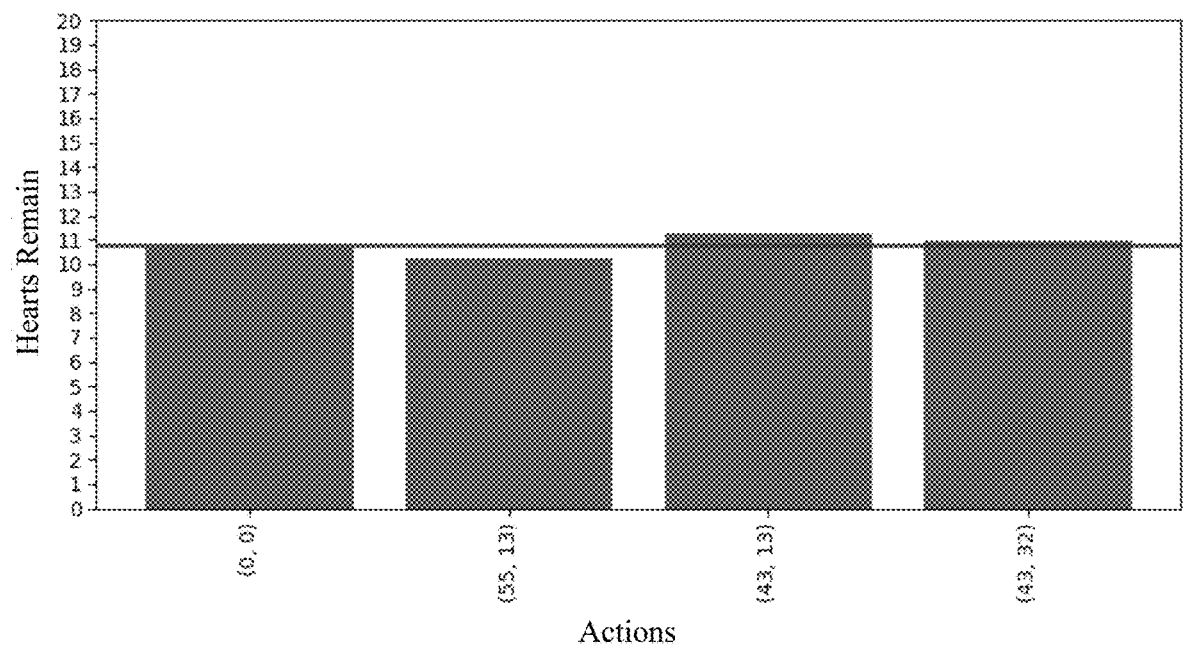
FIG. 14 is average number of hearts obtained after many attempts by Agent at the two hundred and fifty fifth decision-making timing in the game example of FIG. 5.

FIGS. 13 and 14 show a histogram of the number of hearts obtained after multiple attempts by the Agent and an average number of hearts at the two hundred and fifty-fifth decision-making timing, respectively. It is shown that the game difficulty becomes higher, since it is rare that the obtained result has 20 hearts, and the result obtained by each action is no good, which is embodied that the difficulty rises in the curve in FIG. 6.

Figure 15:
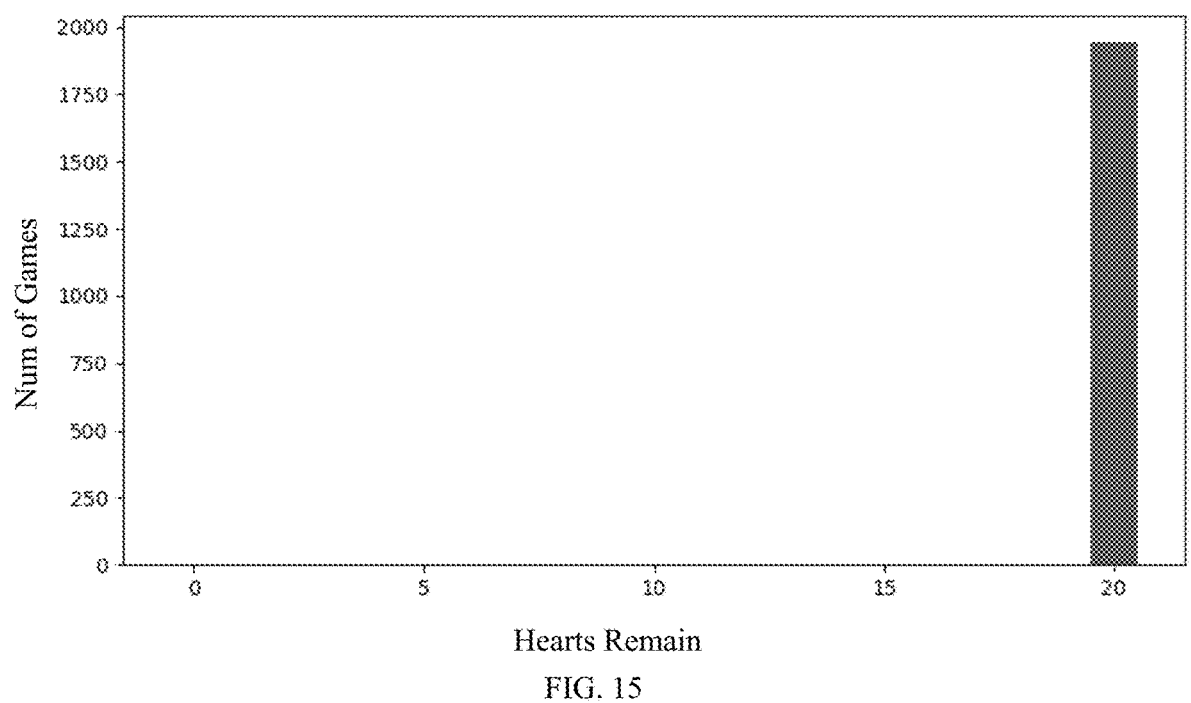
FIG. 15 is a histogram of a number of hearts obtained after many attempts by Agent at the five hundred and first decision-making timing in the game example of FIG. 5.
Figure 16:
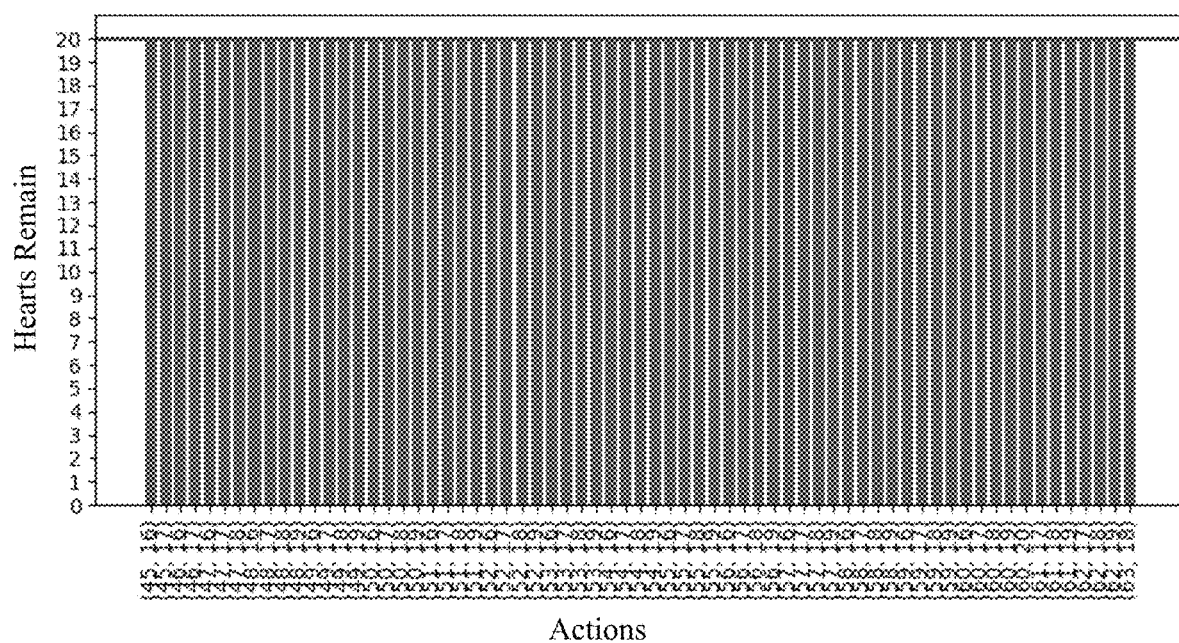
FIG. 16 is average number of hearts obtained after many attempts by Agent at the five hundred and first decision-making timing in the game example of FIG. 5.

FIGS. 15 and 16 show a histogram of the number of hearts obtained after multiple attempts by the Agent and an average number of hearts at the five hundred-first decision-making timing, respectively. This timing is close to the end of the game content. At this timing close to the end, although there are lots of selections, the result obtained by each action is similar and good. Therefore, at the end of the curve in FIG. 6, the difficulty is almost 0.

By the above-mentioned flow and the assessment example, it is seen that the process for game difficulty assessment according to the present disclosure does not need human participation. With the Agent algorithm, the game content may be played automatically by the processor and the game data is recorded. For the recorded game data, it is possible to generate the difficulty changing curve and the final assessment result automatically from a plurality of aspects using assessment algorithm. Since during a period of time, the number of times of playing the game content is greater than the number of times of playing the game content by human players, the time and manpower may be saved greatly, and the assessment is ensured to be more accurate. In addition, the final assessment result may be presented in a numerical value to quantize the whole process, during which, since human is not needed, the result is not affected by human emotion.

In the embodiment of the present disclosure, the difficulty assessment of the newly designed game does not need human participation, and a large amount of game data is generated rapidly by the Agent algorithm. Moreover, the Agent algorithm does not need interface rendering, or the waiting time, so the Agent may rapidly play the game and generate the required data for assessment. In the case of constant parameters of the Agent algorithm, the level of the Agent playing the game is fixed, and for the assessment of different game contents, only the game content changes, and the fixed factor is beneficial to the game designer analyzing the game content according to difficulty. Certainly, according to the embodiment of the present disclosure, the Agent algorithm parameter may be changed as needed, so as to assess the game difficulty from different levels.

Corresponding to the method for game difficulty assessment according to the present disclosure, the present disclosure further provides a system for computer game difficulty assessment, including a game operation unit, a data collector and a difficulty assessment unit.

The game operation unit is used for simulating game playing by operating a computer game through an API of the computer game using an Agent algorithm.

The data collector is used for collecting game data when the operating unit simulates game playing.

The difficulty assessment unit is used for assessing the game difficulty based on the data collected by the data collector. The processor is configured to execute the following processing:

measuring a goal attainment difficulty of the computer game at each decision-making timing according to goal completion degrees of a plurality of goals corresponding to all attempts at each decision-making timing in the recorded game data;

measuring a strategy space-related difficulty of the computer game at each decision-making timing according to goal completion degrees of a plurality of goals corresponding to all actions at each decision-making timing in the recorded game data;

assessing difficulty of the computer game based on a goal attainment difficulty and a strategy space-related difficulty at each timing.

In one embodiment of the present disclosure, the game operation unit, the data collector and the difficulty assessment unit may be implemented on the same or different processors, or by main and slave devices. The Agent algorithm used by the game operation unit may be stored in the storage, and executed in the processor. The data collector may be implemented by the computer software through the processor. The assessment algorithm used by the difficulty assessment unit may be stored in the storage, and executed in the processor. In some embodiments, the game operation unit, the data collector and the difficulty assessment unit may be integrated in one computer and implemented by the computer software. However, the present disclosure is not limited thereto, and they may be distributed on different computers, and the data interaction is realized by wired or wireless data communication. For example, in some implementations, the Agent algorithm may be operated on different processors simultaneously, and the data collected on different processors may be transmitted to the central data collector by the network. After the data collection is finished, the assessment algorithm may process the collected data.

In one embodiment of the present disclosure, a device for computer game difficulty assessment is further provided, including the above-mentioned difficulty assessment unit. In addition, this device may also include the above-mentioned data collector.

The present disclosure also relates to a storage medium, on which a computer program code is stored. When the program code is executed, various embodiments of the method for computer game difficulty assessment according to the present disclosure may be implemented. The storage medium may be a tangible storage medium, such as an optical disk, USB flash disk, soft disk, a hard disk, or the like.

Persons skilled in the art may realize that each exemplary unit and method step described in combination with the disclosed embodiment herein may be implemented by hardware, software or the combination of hardware and software. Whether these functions are executed by way of hardware or software depends on the particular application and design constraints of the technical solution. Those skilled in the art can use different methods for each specific application to achieve the described functions, however, such implementations should not be considered as exceeding the scope of the present disclosure.

The steps of the method or algorithm described in combination with the embodiments of the present disclosure herein may be implemented by software executed by hardware (logic device such as computers). When the software is executed, the steps of the above-mentioned method or its steps may be implemented by the hardware (logic device such as computer), or the hardware (logic device such as computer) serves as the device part of the present disclosure.

The software may be built in RAM, memory, ROM, electrically programmable ROM, electrically erasable programmable ROM, register, hard disk, movable magnetic disk, CD-ROM, or any other forms of storage mediums well-known in the art.

The foregoing embodiments are exemplary and not to limit the present disclosure. Various variants and modifications may be made by those skilled in the art according to the spirits of the present disclosure, and such variants and modifications fall within the scope of the present disclosure.

What is claimed is:

1. A method for computer game difficulty assessment, comprising:

recording game data by a data collector in a process of simulating game playing by operating a computer game through an Application Programming Interface of the computer game using an agent algorithm;

measuring a goal attainment difficulty of the computer game at each decision-making timing according to goal completion degrees of a plurality of goals corresponding to a plurality of attempts at each decision-making timing in the recorded game data;

measuring a strategy space-related difficulty of the computer game at each decision-making timing according to goal completion degrees of a plurality of goals corresponding to a plurality of actions selected at each decision-making timing in the recorded game data, wherein the measuring the strategy space-related difficulty of the computer game at each decision-making timing further comprises:

acquiring a set of goal completion degrees of each goal corresponding to each action at each timing based on the recorded game data, determining an average value and a maximum value of the set of goal completion degrees of each goal corresponding to each action, determining standard deviations of the average value and the maximum value of the goal completion degree of each goal corresponding to each action, and determining the strategy space-related difficulty of the computer game at each timing based on the standard deviations of the average value and the maximum value; and assessing difficulty of the computer game based on the goal attainment difficulty and the strategy space-related difficulty at each timing.

2. The method according to claim 1, wherein the of measuring a goal attainment difficulty of the computer game at each decision-making timing according to goal completion degrees of a plurality of goals corresponding to the plurality of attempts at each decision-making timing in the recorded game data comprises:

acquiring a set of goal completion degrees of each goal corresponding to all attempts at each decision-making timing according to the recorded game data; obtaining an average value and a maximum value of difficulty related to the goal completion degree of each goal based on the set of goal completion degrees of each goal; and assessing a goal attainment difficulty of the computer game at respective decision-making timing based on the average value and the maximum value of the difficulty related to the goal completion degree of each goal.

3. The method according to claim 1, wherein the step of assessing difficulty of the computer game based on the goal attainment difficulty and the strategy space-related difficulty at each timing comprises:

assessing the difficulty of the computer game based on the following formula:

$$D = \Sigma_{t=0}^{T}(C_G \times D_G^t + C_S \times D_S^t);$$

where D represents the difficulty of the computer game, $D_G^t$ represents the goal attainment difficulty at the decision-making timing t, $D_S^t$ represents the strategy space-related difficulty at the decision-making timing t, $C_G$ is a coefficient of $D_G^t$ affecting the difficulty, $C_S$ is the coefficient of $D_S^t$ affecting the difficulty, and T is a final decision-making timing.

4. The method according to claim 3, wherein $D_G^t$ meets the following formula:

$$D_G^t = \Sigma g_j^{g_z} C_{g_j}^{1} \times [\Phi(a\hat{f}, \lambda_a) + \Phi(m\hat{f}, \lambda_m)]|_{g_j},$$

where, $C_{g_j}^1$ is a difficulty adjusting coefficient;

$\Phi(a_{\hat{f}}, \lambda_a)$ and $\Phi(m_{\hat{f}}, \lambda_m)$ are non-linear functions of $a_{\hat{f}}$ and $m_{\hat{f}}$ respectively, where $\lambda_a$ and $\lambda_m$ are non-linear coefficients of $a_{\hat{f}}$ and $m_{\hat{f}}$ respectively;

$a_{\hat{f}} = \mathrm{avg}(S_{\hat{f}})|_{g_j}$, which represents an average value of the set of difficulties related to goal completion degree of the jth goal;

$m_{\hat{f}} = \max(S_{\hat{f}})|_{g_j}$, which represents a maximum value of the set of difficulties related to goal completion degree of the jth goal;

$S_{\hat{f}} = \{\hat{f}_1(g_j), \hat{f}_n(g_j), \ldots, \hat{f}_N(g_j)\}|_{g_j}$, which represents the set of difficulties related to goal completion degree of the jth goal, $\hat{f}(g_j) = 1 - f(g_j)$;

$f(g_j) = g_{c_j}/g_{t_j}$, which represents the goal completion degree of the jth goal;

$g_j$ is the jth goal in the set $G = \{g_1, g_2, \ldots, g_j, \ldots, g_z\}$ of all goals during game playing, $g_{c_j}$ represents the actual level of completion for the jth goal at current timing, $g_{t_j}$ represents the final required level of completion for the jth goal.

5. The method according to claim 3, wherein $D_S^t$ meets the following formula:

$$D_S^t = \Sigma_{g_j=g_1} C_{g_j}^{2} \times [\sigma(a_f^{A_i}) + \sigma(m_f^{A_i})]|_{g_j};$$

where:

$C_{g_j}^2$ is a difficulty adjusting coefficient;

$A_i$ is a set of all actions at the timing i;

$a_f^{A_i} = \{a_f^{\alpha 1}, a_f^{\alpha 2}, \ldots, a_f^{\alpha 1}, \ldots, a_f^{\alpha K}\}$, where K is a number of actions;

$m_f^{A_i} = \{m_f^{\alpha}, m_f^{\alpha 2}, \ldots, m_f^{\alpha k}, \ldots, m_f^{\alpha K}\};$ $a_{\hat{f}} = \mathrm{avg}(S_{\hat{f}})|_{g_j}$, which represents the average value of the set of goal completion degrees of the goal $g_j$ corresponding to the action $a_k$ at the timing t=i, where $S_f^{a_k}$ represents a set of goal completion degrees of the obtained goal $g_j$ by all attempts after the action $a_k$ is selected;

$m_f^{a_k} = \max(S_f^{a_k})|_{g_j}$, which represents the maximum value of the set of goal completion degrees of the goal $g_j$ corresponding to the action $a_k$ at the timing t=i;

$\sigma(a_f^{A_i})$ represents the calculation of a standard deviation for $a_f^{A_i}$; $\sigma(m_f^{A_i})$ represents the calculation of a standard deviation for $m_f^{A_i}$.

6. The method according to claim 1, wherein the Agent algorithm is a randomized algorithm, a Monte Carlo Tree algorithm or a strategy gradient algorithm.

7. A computer device for computer game difficulty assessment, comprising: a storage, a processor and computer program codes stored on the storage and be executable by the processor, wherein the processor implements operations when running the computer program codes thereon, the operations comprising:

receiving game data which is generated when game playing is simulated by operating a computer game through an API of the computer game using an agent algorithm;

measuring a goal attainment difficulty of the computer game at each decision-making timing according to goal completion degrees of a plurality of goals corresponding to a plurality of attempts at each decision-making timing in the recorded game data;

measuring a strategy space-related difficulty of the computer game at each decision-making timing according to goal completion degrees of a plurality of goals corresponding to a plurality of actions selected at each decision-making timing in the recorded game data, wherein the measuring the strategy space-related difficulty of the computer game at each decision-making timing further comprises:

acquiring a set of goal completion degrees of each goal corresponding to each action at each timing based on the recorded game data, determining an average value and a maximum value of the set of goal completion degrees of each goal corresponding to each action, determining standard deviations of the average value and the maximum value of the goal completion degree of each goal corresponding to each action, and determining the strategy space-related difficulty of the computer game at each timing based on the standard deviations of the average value and the maximum value; and assessing difficulty of the computer game based on the goal attainment difficulty and the strategy space-related difficulty at each timing.

8. The computer device according to claim 7, the operations further comprising:

simulating game playing by operating a computer game through an API of the computer game using an agent algorithm; and collecting the game data when the operating unit simulates game playing, wherein the processor receives the game data from a data collector.

9. The computer device according to claim 7, wherein the measuring a goal attainment difficulty of the computer game at each decision-making timing further comprises:

acquiring a set of goal completion degrees of each goal corresponding to all attempts at each decision-making timing according to the recorded game data;

obtaining an average value and a maximum value of difficulty related to the goal completion degree of each goal based on the set of goal completion degrees of each goal; and assessing a goal attainment difficulty of the computer game at respective decision-making timing based on the average value and the maximum value of the difficulty related to the goal completion degree of each goal.

10. The computer device according to claim 1, wherein the assessing difficulty of the computer game based on the goal attainment difficulty and the strategy space-related difficulty at each timing comprises:

assessing the difficulty of the computer game based on the following formula:

$$D=\Sigma_{t=0}^{T}(C_G \times D_G^t + C_S \times D_S^t);$$

where D represents the difficulty of the computer game, $D_G^t$ represents the goal attainment difficulty at the decision-making timing t, $D_S^t$ represents the strategy space-related difficulty at the decision-making timing t, $C_G$ is a coefficient of $D_G^t$ affecting the difficulty, $C_S$ is the coefficient of $D_S^t$ affecting the difficulty, and T is a final decision-making timing.

11. A non-transitory computer storage medium, on which computer program codes are stored; when the computer program codes are executed by a computing device, the computer program codes cause the computing device to perform operations, the operations comprising:

recording game data by a data collector in a process of simulating game playing by operating a computer game through an Application Programming Interface of the computer game using an agent algorithm;

determining a goal attainment difficulty of the computer game at each decision-making timing base on goal completion degrees of a plurality of goals corresponding to a plurality of attempts at each decision-making timing in the recorded game data;

determining a strategy space-related difficulty of the computer game at each decision-making timing based on goal completion degrees of a plurality of goals corresponding to a plurality of actions selected at each decision-making timing in the recorded game data wherein the determining the strategy space-related difficulty of the computer game at each decision-making timing further comprises:

acquiring a set of goal completion degrees of each goal corresponding to each action at each timing based on the recorded game data, determining an average value and a maximum value of the set of goal completion degrees of each goal corresponding to each action, determining standard deviations of the average value and the maximum value of the goal completion degree of each goal corresponding to each action, and determining the strategy space-related difficulty of the computer game at each timing based on the standard deviations of the average value and the maximum value; and assessing difficulty of the computer game based on the goal attainment difficulty and the strategy space-related difficulty at each timing.

12. The non-transitory computer storage medium of claim 11, wherein the determining a goal attainment difficulty of the computer game at each decision-making timing based on goal completion degrees of a plurality of goals corresponding to the plurality of attempts at each decision-making timing in the recorded game data further comprises:

acquiring a set of goal completion degrees of each goal corresponding to all attempts at each decision-making timing according to the recorded game data;

obtaining an average value and a maximum value of difficulty related to the goal completion degree of each goal based on the set of goal completion degrees of each goal; and assessing a goal attainment difficulty of the computer game at respective decision-making timing based on the average value and the maximum value of the difficulty related to the goal completion degree of each goal.

13. The non-transitory computer storage medium of claim 11, wherein the assessing difficulty of the computer game based on the goal attainment difficulty and the strategy space-related difficulty at each timing further comprises:

assessing the difficulty of the computer game based on the following formula:

$$D=\Sigma_{t=0}^{T}(C_G \times D_G^t + C_S \times D_S^t);$$

where D represents the difficulty of the computer game, $D_G^t$ represents the goal attainment difficulty at the decision-making timing t, $D_S^t$ represents the strategy space-related difficulty at the decision-making timing t, $C_G$ is a coefficient of $D_G{}^t$ affecting the difficulty, $C_S$ is the coefficient of $D_S{}^t$ affecting the difficulty, and T is a final decision-making timing.

14. The non-transitory computer storage medium of claim 13, wherein $D_G{}^t$ meets the following formula:

$$D_G{}^T = \Sigma_{g_j=g_1}^{g_z} C_{g_j}^1 \times [\Phi(a_{\hat{f}}, \lambda_a) + \Phi(m_{\hat{f}}, \lambda_m)]|_{g_j},$$

where, $C_{g_j}^1$ is a difficulty adjusting coefficient;

$\Phi(a_{\hat{f}}, \lambda_a)$ and $\Phi(m_{\hat{f}}, \lambda_m)$ are non-linear functions of $a_{\hat{f}}$ and $m_{\hat{f}}$ respectively, where $\lambda_a$ and $\lambda_m$ are non-linear coefficients of $a_{\hat{f}}$ and $m_{\hat{f}}$ respectively;

$a_{\hat{f}} = \mathrm{avg}(S_{\hat{f}})|_{g_j}$, which represents an average value of the set of difficulties related to goal completion degree of the jth goal;

$m_{\hat{f}} = \max(S_{\hat{f}})|_{g_j}$, which represents a maximum value of the set of difficulties related to goal completion degree of the jth goal;

$S_{\hat{f}} = \{\hat{f}_1(g_j), \hat{f}_n(g_j), \ldots, \hat{f}_N(g_j)\}|_{g_j}$, which represents the set of difficulties related to goal completion degree of the jth goal, $\hat{f}(g_j) = 1 - f(g_j)$;

$f(g_j) = g_{c_j}/g_{t_j}$, which represents the goal completion degree of the jth goal;

$g_j$ is the jth goal in the set $G = \{g_1, g_2, \ldots, g_j, \ldots, g_z\}$ of all goals during game playing, $g_{c_j}$ represents the actual level of completion for the jth goal at current timing, $g_{t_j}$ represents the final required level of completion for the jth goal.

15. The non-transitory computer storage medium of claim 13, wherein $D_S{}^t$ meets the following formula:

$$D_S{}^t = \Sigma_{g_j=g_1} C_{g_j}^2 \times [\sigma(a_f^{A_i}) + \sigma(m_f^{A_i})]|_{g_j};$$

where:

$C_{g_j}^1$ is a difficulty adjusting coefficient;

$A_i$ is a set of all actions at the timing i;

$a_f^{A_i} = \{a_f^{\alpha_1}, a_f^{\alpha_2}, \ldots, a_f^{\alpha_1}, \ldots, a_f^{\alpha_K}\}$, where K is a number of actions;

$m_f^{A_i} = \{m_f^{\alpha_1}, m_f^{\alpha_2}, \ldots, m_f^{\alpha_k}, \ldots, m_f^{\alpha_K}\};$ $a_{\hat{f}} = \mathrm{avg}(S_{\hat{f}})|_{g_j}$, which represents the average value of the set of goal completion degrees of the goal $g_j$ corresponding to the action $a_k$ at the timing t=i, where $S_f^{a_k}$ represents a set of goal completion degrees of the obtained goal $g_j$ by all attempts after the action $a_k$ is selected;

$m_f^{a_k} = \max(S_f^{a_k})|_{g_j}$, which represents the maximum value of the set of goal completion degrees of the goal $g_j$ corresponding to the action $a_k$ at the timing t=i;

$\sigma(a_f^{A_i})$ represents the calculation of a standard deviation for $a_f^{A_i}$; $\sigma(m_f^{A_i})$ represents the calculation of a standard deviation for $m_f^{A_i}$.

16. The non-transitory computer storage medium of claim 11, wherein the Agent algorithm is a randomized algorithm, a Monte Carlo Tree algorithm or a strategy gradient algorithm.

* * * * *